United States Patent [19]
Klingman

[11] Patent Number: 5,253,273
[45] Date of Patent: Oct. 12, 1993

[54] ISDN "S" SIGNAL DETECTION AND DISPLAY APPARATUS

[76] Inventor: Edwin E. Klingman, 3000 Highway 84, San Gregorio, Calif. 94074

[21] Appl. No.: 761,665

[22] Filed: Sep. 18, 1991

[51] Int. Cl.[5] .............................................. H04L 7/04
[52] U.S. Cl. ................................ 375/114; 370/105.4; 324/76.15
[58] Field of Search .................... 375/114, 116, 10, 12, 375/19, 110, 111; 370/105.1, 13, 17, 105.4; 371/22.1, 25.1, 29.1; 324/76 R; 379/96

[56] References Cited

U.S. PATENT DOCUMENTS 4,503,544 3/1985 Musin et al. ........................... 375/10

OTHER PUBLICATIONS

Intel; Product Specification; 8051 Single-Chip Microcomputer Architectural Specification and Functional Description (Author/Publisher unknown); Illustrated ISDN.
Siemens, Product Literature regarding ISDN Subscriber Access Controller (ISAC-S); PEB 2085.

Primary Examiner—Curtis Kuntz
Assistant Examiner—Tesfaldet Bocure
Attorney, Agent, or Firm—Claude A. S. Hamrick

[57] ABSTRACT

A ISDN "S" signal detection and display apparatus including a clock signal generator for synchronizing to the "S signal" and for developing a frame sync clock, a signal converter for connection across the "S" interface to develop a "clean" digital signal corresponding to S-signals received at the "S" interface, a signal processor responsive to the frame sync clock and operative to sample successive S-signals, a storage buffer for temporarily storing the sampled signals, and a display for reporting and/or displaying the averaged signals.

20 Claims, 2 Drawing Sheets

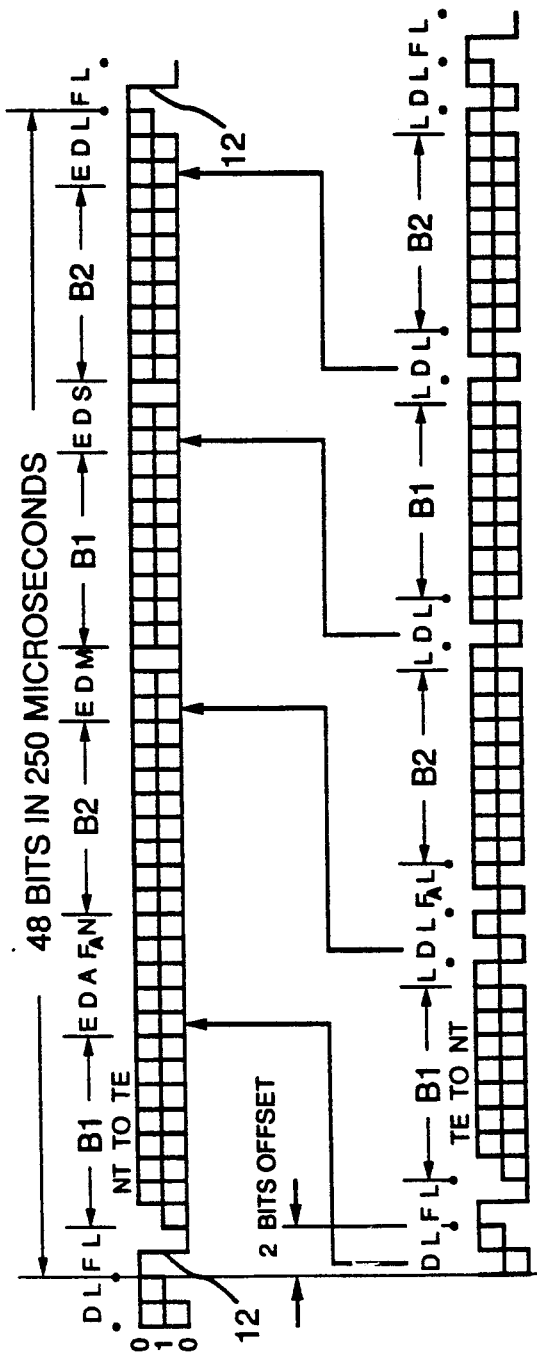

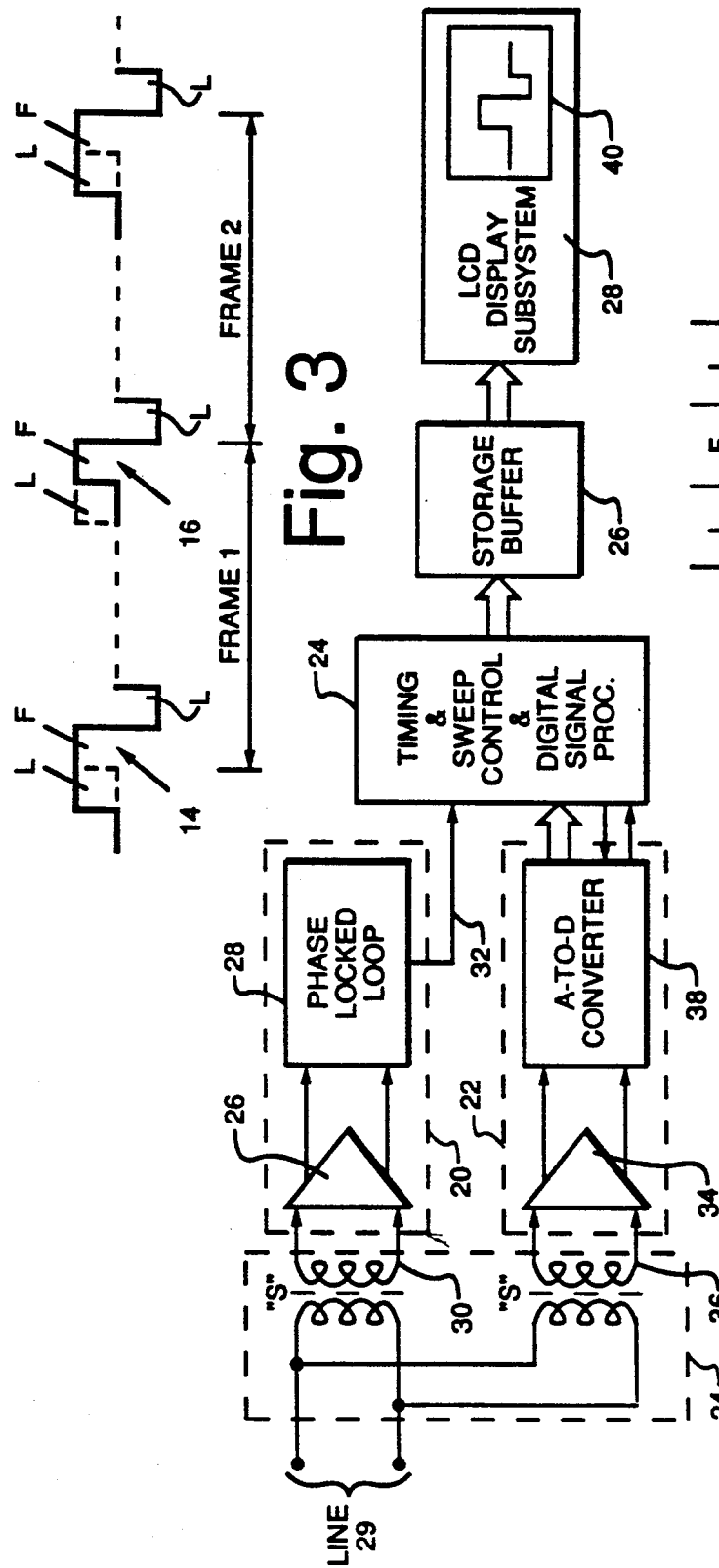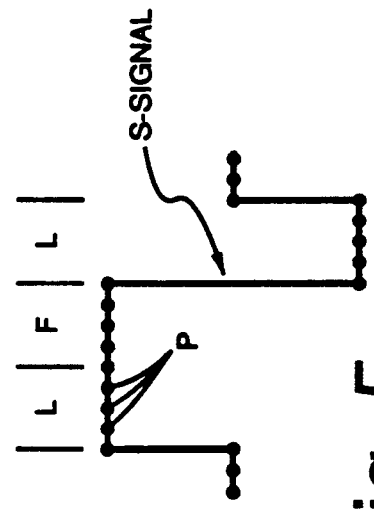

ISDN "S" SIGNAL DETECTION AND DISPLAY APPARATUS

BACKGROUND OF THE INVENTION

1. Field of the Invention

The present invention relates generally to signal detecting apparatus and more particularly to a method and apparatus for detecting and displaying a particular type of periodically recurrent signal in a data stream. A specific example of a signal to be detected is the synchronizing "S" signal used in an ISDN communication network.

2. Brief Description of the Prior Art

In order to make a stream of analog or digital data intelligible, it is necessary that some type of reference component be inserted into the data stream so that it can be detected and then used as a benchmark from which to interpret the information content of the stream. A classical example of such a data stream in the analog domain is a television signal which includes sync pulses used to identify the start of each scan line. In the digital world, synchronizing frame bits are used to identify the beginning and ending of data words containing a plurality of digital bits of data.

In communications networks, the accuracy and efficiency of the medium is directly related to the ability of the network to faithfully communicate the synchronizing signals. In an attempt to standardize communications links, media and interfaces, the CCITT, a communications standard group that is part of the United Nations, has defined a recommendation for a worldwide Integrated Services Digital Network (ISDN) capable of handling voice and data over copper wires, fiberoptics, satellite channels and other implementations of future technologies.

Because such a system must encompass high-level data such as video images, computer messages, voice communications, and other information, and must also specify low-level data concerning wires, connectors, frequencies, voltages, etc., the system has been designed in "layers" with the bottom layer (layer 1) representing the physical phenomenon, and the top layer (layer 7) representing user applications. In between are layers that partition the network in terms of well-defined interfaces that range from the interface at the bottom (physical) layer, over which physical signals are passed, up an increasingly abstract hierarchy to the most general, "application", layer which represents the user's desired task or application that makes use of the digital (ISDN) communications network. The CCITT layers are rigorously defined at the interfaces between layers, and the messages that flow between the layers are also specified.

It is important to note that the implementation of the layers is not specified, leaving complete freedom to the designer of the layered communication system. In use, messages flow down from the top layers to the physical layer, across the network, and up to the "peer" layer at the destination.

While the seven-layer scheme is designed to allow any computer to communicate with any other computer, regardless of make or manufacture, the top layers are not absolutely essential to successful communications across the network. The bottom three layers, i.e., the Physical (1), Data Link (2), and Network (3) layers, are essential, and must exist where any device or system is capable of communicating across the ISDN.

The ISDN network recommended by the CCITT committee uses a four-wire connection from the network to the subscriber defined as the "S" interface. The signals flowing between the Subscriber (S) and the Network Terminator (T) points are depicted in FIGS. 1 and 2 of the drawing.

According to the CCITT recommendation, and as particularly depicted in FIG. 1, a pseudo-ternary code with 100% pulse width is used on the "S" interface. An example of pseudo-ternary code is shown at 10. A logical 1 corresponds to a neutral level (no current), whereas logical 0's are coded as alternating positive and negative pulses.

The frame structures of the signals flowing from network to subscriber, and from subscriber to network are shown in FIG. 2. One S-frame consists of 48 bits at a nominal bit rate of 192 kbps. Thus, each frame carries two octets of data corresponding to a first channel B1, two octets of data corresponding to a second channel B2, and four channel identifying D-bits, according to the B1+B2+D structure defined for the ISDN basic access (total useful data rate: 144 kbps). The start of a frame is marked using a code violation in the form of a framing bit "F" which, because of its shape, is referred to herein as the "S" signal, or frame sync signal.

Although an acceptable pulse shape is defined by a "template", including framing limits which bracket the tolerance limits of the S-shaped pulses, most pulses are measured and displayed in terms of "eye" diagrams. This is partly due to the fact that since there is no CCITT-defined method of implementing the waveform, there is no standard way to synchronize to the "S" signal for measurement purposes. However, from the Frame Structure diagram shown in FIG. 2, it can be determined that one of the 48 bits, i.e., the bit 12, crossing the "S" interface every 250 microseconds (i.e. 8,000·48 bit frames/sec) has a defined transition, all other bit transitions depending on B-channel, D-channel, balance bits and other bits preceding the transition.

Because the frame balancing begins anew with each frame, the balance bit (L) that immediately follows the "high" frame sync (F) bit must be "low" to balance the DC charge build-up on the line. The voltage waveform at the framing bit as received at the subscriber-receiver terminal will therefore have the forms illustrated in FIG. 3. Note that on each side of the framing bit "F" there is a DC balancing bit "L", the polarity of which will change dependent upon the data that appears in the D and B channels. If no data appears within the frames, the states of the balance bits will alternate, as depicted at 14 and 16, in order to maintain DC balance on the line. The alternating "fat top", "thin top", "fat top" . . . characteristic will therefore make it difficult to use a simple oscilloscope-type technique to lock onto and display the condition of the framing bit.

SUMMARY OF THE PRESENT INVENTION

It is therefore a principal objective of the present invention to provide a method and apparatus for capturing and processing a periodically occurring data signal.

Another object of the present invention is to provide a device of the type described which enables a captured signal to be analyzed and/or displayed for visual analysis.

Yet another object of the present invention is to provide a method and apparatus of the type described, particularly suited for capturing and processing the frame sync signal used in CCITT ISDN communication systems so that it can be analyzed, or displayed for visual analysis.

Briefly, a preferred embodiment of the present invention includes a clock signal generator for synchronizing to the "S signal" and for developing a frame sync clock, a signal converter for connection across the "S" interface to develop a "clean" digital signal corresponding to S-signals received at the "S" interface, a signal processor responsive to the frame sync clock and operative to sample successive S-signals, a storage buffer for temporarily storing the sampled signals, and a display for reporting and/or displaying the averaged signals.

Among the numerous advantages of the present invention is that it provides a means for accurately determining the condition of a captured signal.

Another advantage of the present invention is that it provides an accurate visual display of a captured signal.

Still another advantage of the present invention is that it can be used to provide an accurate depiction of an ISDN frame sync signal.

These and other objects and advantages of the present invention will no doubt become apparent to those skilled in the art after having read the following detailed description of the preferred embodiment which is illustrated in the several figures of the drawing.

IN THE DRAWING

FIG. 1 is a diagram illustrating a pseudo-ternary code;

FIG. 2 is a diagram illustrating the frame structure of communication signals used in accordance with the ISDN communications network;

FIG. 3 is a diagram illustrating the form taken by three ISDN frame sync signals;

FIG. 4 is a block diagram illustrating a signal processing apparatus in accordance with the present invention; and FIG. 5 is a diagram illustrating the sampling of an "S-signal" in accordance with the present invention.

DETAILED DESCRIPTION OF THE PREFERRED EMBODIMENT

Referring now to FIG. 4 of the drawing, a presently preferred embodiment of the present invention is depicted to comprise a frame sync clock generator 20, a signal acquisition and digitizer 22, a signal processor 24, a storage buffer 26, and an LCD display subsystem 28. Clock generator 20 and digitizer 22 are adapted to simultaneously receive the same input signal from an appropriate connector which, in the illustrated example, is an ISDN "S" interface 24.

Clock generator 20 includes a pre-amp 26 and a phase-locked loop circuit 28. The input of amplifier 26 is connected to a first secondary winding 30 of the S interface 24 and serves to isolate and appropriately amplify the line signal for input to the phase-locked loop (PLL) 28. The PLL 28 in turn extracts the sync signal from the data transmitted over the ISDN network line 29 and outputs a sync signal at 32 for each frame sync pulse received. In the preferred embodiment a Siemens 2085 ISDN Subscriber Access Controller or equivalent is used to perform the function of unit 20.

The signal on the network line 29 is also monitored using an instrumentation amplifier 34, or equivalent circuit, the input of which is connected to a second secondary winding 36 of interface 24, and serves to amplify and isolate the network line from the input to an analog-to-digital converter (ADC) 38. In the preferred embodiment an AD 521K Instrumentation Amplifier is used for amplifier 34, and an AD 7569 Analog-to-Digital Converter is used for ADC 38.

Although the present invention could be used to display any selected portion of a frame of any type of frame formatted input data, the preferred embodiment is configured to select and display only the framing bit "F" and associated DC balancing bits "L" of an incoming or outgoing ISDN communications signal, the "S-signal". Moreover, since the objective is to provide an indication of the quality of a communication signal, and it is presumed that an indication of the quality of any bit in the frame will be representative of the quality of all bits in the frame, a sampling of the S-signal will be the easiest to acquire because it is the only bit in the frame whose state is not variable. However, it must be recognized that because the "F" bit is bracketed by "L" bits (balance bits), the shape of the S-signal will change dependent upon the data being transmitted in the B and D channels. Furthermore, since it is known that when no data is being communicated, the shape of the S-signal will alternate as depicted in FIG. 3, it will be necessary that only alternate S-signals be sampled for display.

The signal sampling is effected and controlled by the processor 24 which initiates a signal conversion by ADC 38 and reads the digital result of the conversion. The processor 24 synchronizes to the ISDN S-signal by monitoring the frame sync clock on line 32 and selecting the particular frame portion of interest. Although the selected portion of the signal can be sampled at any appropriate sample rate, the preferred embodiment minimizes the cost of the sampling, processing, storage and display subsystems. The lowest cost components that provide visually acceptable signals use a display field of approximately 64 by 64 horizontal vertical display points, i.e. 6-bit vertical display resolution and 64 successive points in time.

Since the duration of the frame bit is 250 microseconds/48 bits = 5 microseconds, a sample rate of 5 microseconds/50 points = 0.1 microsecond per sample is suggested. Sampling more slowly than this would make possible the use of lower cost components. The preferred embodiment makes use of the cyclical nature of the frame sync signal (S-signal) to sample successive frame sync signal and construct a composite signal by processing these samples. The processor 24 synchronizes to the frame sync clock on line 32 and, as depicted in FIG. 5, samples the incoming signal at a multiplicity of data points "P", taken before during and after the frame sync pulse "F", with precise timing and stores the sampled signal information in buffer 26. In the preferred embodiment, the processor 24 is a CY275 microcontroller made by Cybernetics Micro Systems of San Gregorio, Calif.

The sampled data (point data signal) stored in buffer 26 is then read out by subsystem 28 and displayed on a liquid crystal display (LCD) screen 40 (FIG. 4) to provide a visual indication of the quality of the detected signal. The described embodiment will be particularly useful to those who install and maintain telephone and data communication equipment because it provides an easily interpretable visual indication of the quality of the received or returned communication signal.

Although the present invention has been described above in terms of a single preferred embodiment, it is anticipated that in view of this disclosure various alterations and modifications thereof will be apparent to those skilled in the art. It is therefore intended that the appended claims be interpreted as covering all such alterations and modifications as fall within the true spirit and scope of the invention.

What is claimed is:

1. A signal processing and display apparatus for monitoring a selected portion of data signals having a synchronized data frame format including a frame sync signal, comprising:
   clock signal generating means for receiving the data signals to be monitored and for generating clock signals corresponding to the frame sync signal included in each data frame;
   signal converter means for receiving the data signals and for digitally sampling at least portions thereof;
   processor means responsive to said clock signals and operative to cause said converter means to select and digitally sample a portion of the data within selected data frames of the received data signals at predetermined time intervals less than the duration of said frame sync signal and to output a plurality of data point signals corresponding to the amplitude of each sample of the sampled portion;
   buffer means for temporarily storing said data point signals; and
   display means for using the stored data point signals to provide a visual display of said selected portion.

2. A signal processing and display apparatus as recited in claim 1 wherein said clock signal generating means includes a phase-locked loop circuit adapted to lock to the frame sync signal of each data frame and to cause said clock signals to include clock pulses corresponding thereto.

3. A signal processing and display apparatus as recited in claim 2 wherein said signal converter means includes an analog-to-digital converter for digitally sampling said selected portion of each said selected data frame.

4. A signal processing and display apparatus as recited in claim 3 wherein said signal converter means further includes amplifying means for amplifying the received data signals and isolating said analog-to-digital converter from a source from which such signals are obtained.

5. A signal processing and display apparatus as recited in claim 4 wherein said selected data frames are alternate data frames of said data signals, said selected portions include frame sync signals, and said plurality of data point signals correspond to particular points in time during and immediately preceding and following the frame sync signals in said selected portions.

6. A signal processing and display apparatus as recited in claim 5 wherein said data point signals temporarily stored in said buffer means represent time arranged data values corresponding to said particular points in time.

7. A signal processing and display apparatus as recited in claim 1 wherein said signal converter means includes an analog-to-digital converter for digitally sampling said selected portion of each said selected data frame.

8. A signal processing and display apparatus as recited in claim 7 wherein said signal converter means further includes amplifying means for amplifying the received data signals and for isolating said analog-to-digital converter from a source from which such received data signals are obtained.

9. A signal processing and display apparatus as recited in claim 1 wherein said selected data frames are alternate data frames of said received data signals, said selected portions include frame sync signals, and said plurality of data point signals correspond to particular points in time during and immediately preceding and following the frame sync signals in said selected portions.

10. A signal processing and display apparatus as recited in claim 1 wherein said data point signals temporarily stored in said buffer means represent time arranged data values corresponding to said particular points in time.

11. Apparatus for monitoring the frame sync bit of data within selected data frames included in ISDN communication data signals, comprising:
    clock signal generating means adapted to connect to an "S" interface of an ISDN communication network to receive communicated data signals and adapted to generate a clock signal corresponding to the frame sync bit of the data within each communicated data frame;
    signal converter means for receiving the communicated data signals and for digitally sampling portions thereof;
    processor means responsive to said clock signal and operative to cause said converter means to select and digitally sample a portion of the data within selected data frames of the received data signals at predetermined time intervals less than the duration of said frame sync bit and to output a plurality of data point signals corresponding to the amplitude of each sample of the sampled portion;
    buffer means for temporarily storing said data point signals; and
    display means for using the stored data point signals to provide a visual display of the selected portion.

12. A signal processing and display apparatus as recited in claim 11 wherein said clock signal generating means includes a phase-locked loop circuit adapted to lock to said frame sync pulses and to cause said clock signal to include clock pulses corresponding thereto.

13. A signal processing and display apparatus as recited in claim 12 wherein said signal converter means includes an analog-to-digital converter for digitally sampling said selected portion of each said selected data frame.

14. A signal processing and display apparatus as recited in claim 13 wherein said signal converter means further includes amplifying means for amplifying the received data signals and for isolating said analog-to-digital converter from the "S" interface.

15. A signal processing and display apparatus as recited in claim 14 wherein said selected data frames are alternate data frames of said received data signals, said selected portions include the frame sync bit, and said plurality of data point signals correspond to particular points in time during and immediately preceding and following the frame sync bit in said selected portions.

16. A signal processing and display apparatus as recited in claim 15 wherein said data point signals temporarily stored in said buffer means represent time arranged data values corresponding to said particular points in time.

17. A signal processing and display apparatus as recited in claim 11 wherein said signal converter means includes an analog-to-digital converter for digitally sampling said selected portion of each said selected data frame.

18. A signal processing and display apparatus as recited in claim 17 wherein said signal converter means further includes amplifying means for amplifying the received data signals and isolating said analog-to-digital converter from the "S" interface.

19. A signal processing and display apparatus as recited in claim 11 wherein said selected data frames are alternate data frames of said received data signals, said selected portions include the frame sync bit, and said plurality of data point signals correspond to particular points in time during and immediately preceding and following the frame sync bit in said selected portions.

20. A signal processing and display apparatus as recited in claim 11 wherein said data point signals temporarily stored in said buffer means represent time arranged data values corresponding to said particular points in time.

* * * * *